(12) United States Patent
Pugazhendhi et al.

(10) Patent No.: US 10,528,991 B2
(45) Date of Patent: Jan. 7, 2020

(54) AUGMENTED REALITY VIEW OF PRODUCT INSTRUCTIONS

(71) Applicant: PayPal, Inc., San Jose, CA (US)

(72) Inventors: Bagath Pugazhendhi, Fremont, CA (US); Steve Yankovich, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 15/961,483

(22) Filed: Apr. 24, 2018

(65) Prior Publication Data

US 2019/0122269 A1 Apr. 25, 2019

Related U.S. Application Data

(63) Continuation of application No. 14/990,291, filed on Jan. 7, 2016, now Pat. No. 9,953,350, and a continuation of application No. 13/624,682, filed on Sep. 21, 2012, now Pat. No. 9,336,541.

(51) Int. Cl.
| | |
|---|---|
| *G06Q 30/02* | (2012.01) |
| *G06F 3/147* | (2006.01) |
| *G06F 3/01* | (2006.01) |
| *G06K 9/00* | (2006.01) |
| *G06Q 30/06* | (2012.01) |
| *G06T 19/00* | (2011.01) |
| *H04N 5/225* | (2006.01) |

(52) U.S. Cl.
CPC ......... *G06Q 30/0281* (2013.01); *G06F 3/011* (2013.01); *G06F 3/147* (2013.01); *G06K 9/00006* (2013.01); *G06Q 30/0261* (2013.01); *G06Q 30/0631* (2013.01); *G06T 19/006* (2013.01); *H04N 5/225* (2013.01); *G09G 2370/022* (2013.01); *G09G 2370/027* (2013.01); *G09G 2370/04* (2013.01); *G09G 2380/14* (2013.01)

(58) Field of Classification Search
CPC .......................... G06T 19/006; G06Q 30/0281
See application file for complete search history.

(56) References Cited

U.S. PATENT DOCUMENTS

| | | | | |
|---|---|---|---|---|
| 2011/0187746 | A1* | 8/2011 | Suto | G09G 5/00 345/634 |
| 2012/0038670 | A1* | 2/2012 | Choi | G06T 19/006 345/633 |
| 2014/0063054 | A1* | 3/2014 | Osterhout | G06F 3/005 345/633 |

* cited by examiner

*Primary Examiner* — Ryan R Yang
(74) *Attorney, Agent, or Firm* — Maschoff Brennan

(57) ABSTRACT

In a system for presenting augmented reality views of product instructions a method may include receiving a request from a client device, the request including image data. The method may further includes identifying an object in the image data and generating an augmented reality view of the identified object. The method may further include transmitting the augmented reality view to the client device.

20 Claims, 6 Drawing Sheets

AUGMENTED REALITY VIEW OF PRODUCT INSTRUCTIONS

RELATED APPLICATIONS

This application is a continuation of U.S. patent application Ser. No. 14/990,291, filed Jan. 7, 2016, entitled "AUGMENTED REALITY VIEW OF PRODUCT INSTRUCTIONS," (and issued as U.S. Pat. No. 9,953,350 on Apr. 24, 2018), which claims the benefit of priority to U.S. application Ser. No. 13/624,682, filed on Sep. 21, 2012, entitled "AUGMENTED REALITY PRODUCT INSTRUCTIONS, TUTORIALS AND VISUALIZATIONS," (and issued as U.S. Pat. No. 9,336,541 on May 10, 2016), which is hereby incorporated by reference.

TECHNICAL FIELD

Example embodiments of the present application generally relate to image recognition, and more particularly, to a system and method for enhanced product instructions, tutorials, and visualizations using augmented reality.

BACKGROUND

Today's products are increasingly complex to set up and operate. Often, the products are accompanied with detailed instructions that may be daunting for a user to follow. In other cases, a user may discard instructions after an initial set up of a product. In yet other cases, it may be difficult to determine what product accessories are required for a product. In each of these cases, the user's ability to operate the product may be hampered by a lack of information about the product or an inability to use the product. This in turn may affect the user's experience with the product and the user's perception of the manufacturer of the product.

BRIEF DESCRIPTION OF THE DRAWINGS

In the drawings, which are not necessarily drawn to scale, like numerals describe substantially similar components throughout the several views. The drawings illustrate generally, by way of example, but not by way of limitation, various embodiments discussed in the present document.

DETAILED DESCRIPTION

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

In various embodiments, a system and method to provide instructions, visualizations, and recommendations based on an augmented reality view of an item are disclosed.

Figure 1:
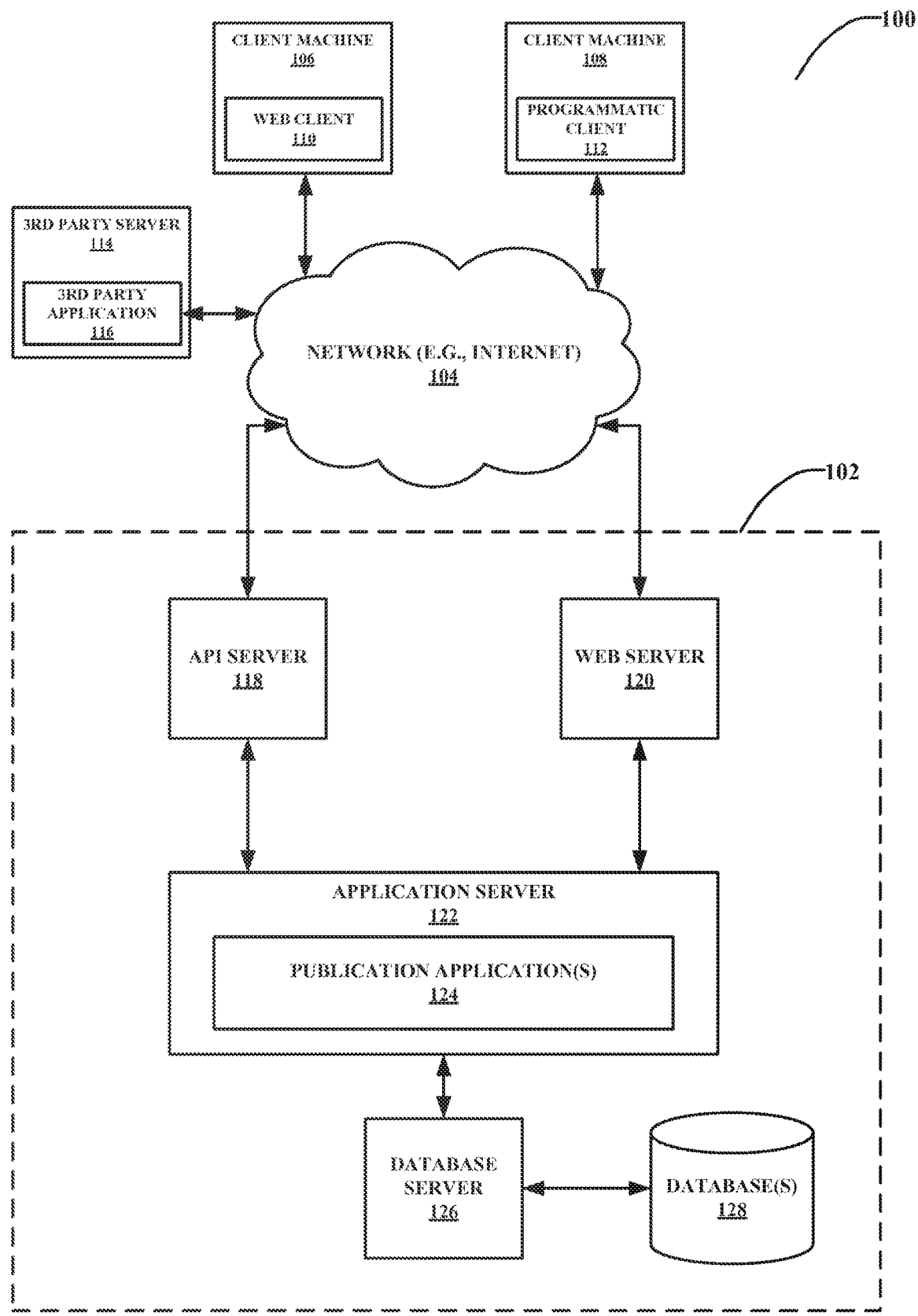
FIG. 1 is a network diagram depicting a network system, according to some embodiments, having a client-server architecture configured for exchanging data over a network.

FIG. 1 is a network diagram depicting a network system 100, according to one embodiment, having a client-server architecture configured for exchanging data over a network. For example, the network system 100 may be a publication/publisher system 102 where clients may communicate and exchange data within the network system 100. The data may pertain to various functions (e.g., online item purchases) and aspects (e.g., managing content) associated with the network system 100 and its users. Although illustrated herein as a client-server architecture as an example, other embodiments may include other network architectures, such as a peer-to-peer or distributed network environment.

A data exchange platform, in an example form of a network-based publisher 102, may provide server-side functionality, via a network 104 (e.g., the Internet), to one or more client devices. The one or more client devices may be operated by users that use the network system 100 and more specifically, the network-based publisher 102, to exchange data over the network 104. These transactions may include transmitting, receiving (communicating) and processing data to, from, and regarding content and users of the network system 100. The data may include, but are not limited to, content and user data such as image data; product and service reviews; product, service, manufacture, and vendor recommendations and identifiers; product and service listings associated with buyers and sellers; product tutorials and instructions; product visualization data; auction bids; and transaction data, among other things.

In various embodiments, the data exchanges within the network system 100 may be dependent upon user-selected functions available through one or more client or user interfaces (UIs). The UIs may be associated with a client device, such as a client device 106 using a web client 110. The web client 110 may be in communication with the network-based publisher 102 via a web server 120. The UIs may also be associated with a client device 108 using a programmatic client 112, such as a client application, or a third party system 114 (e.g., one or more servers or client devices) hosting a third party application 116. It can be appreciated in various embodiments the client device 106, 108, and/or the third party system 114 may be associated with a buyer, a seller, a third party electronic commerce platform, a payment service provider, or a shipping service provider, each in communication with the network-based publisher 102 and optionally each other. The buyers and sellers may be any one of individuals, merchants, or service providers, among other things.

Turning specifically to the network-based publisher 102, an application program interface (API) server 118 and a web server 120 are coupled to, and provide programmatic and web interfaces respectively to, one or more application servers 122. The application servers 122 host one or more publication application(s) 124. The application servers 122 are, in turn, shown to be coupled to one or more database server(s) 126 that facilitate access to one or more database(s) 128.

In one embodiment, the web server 120 and the API server 118 communicate and receive data pertaining to listings, transactions, and feedback, among other things, via various user input tools. For example, the web server 120 may send and receive data to and from a toolbar or webpage on a browser application (e.g., web client 110) operating on a client machine (e.g., client machine 106). The API server 118 may send and receive data to and from an application (e.g., client application 112 or third party application 116) running on another client machine (e.g., client machine 108 or third party server 114).

The publication application(s) 124 may provide a number of publisher functions and services (e.g., listing, payment, etc.) to users that access the network-based publisher 102. For example, the publication application(s) 124 may provide a number of services and functions to users for listing goods and/or services for sale, facilitating transactions, and reviewing and providing feedback about transactions and associated users. Additionally, the publication application(s) 124 may track and store data and metadata relating to listings, transactions, and user interaction with the network-based publisher 102. The publication application(s) 124 may aggregate the feedback and/or the tracked data and metadata to enable a user to collectively view accumulated feedback and/or tracked data. In one example embodiment, from the aggregated data, the publication application(s) 124 may determine a reputation, for example, in the form of a score or value, for one or more users of a network-based community, the reputation value being based on one or more user attributes associated with the one or more users.

FIG. 1 also illustrates a third party application 116 that may execute on a third party system 114 and may have programmatic access to the network-based publisher 102 via the programmatic interface provided by the API server 118. For example, the third party application 116 may use information retrieved from the network-based publisher 102 to support one or more features or functions on a website hosted by the third party. The third party website may, for example, provide one or more listing, informational, publisher, or payment functions that are supported by the relevant applications of the network-based publisher 102.

Figure 2:
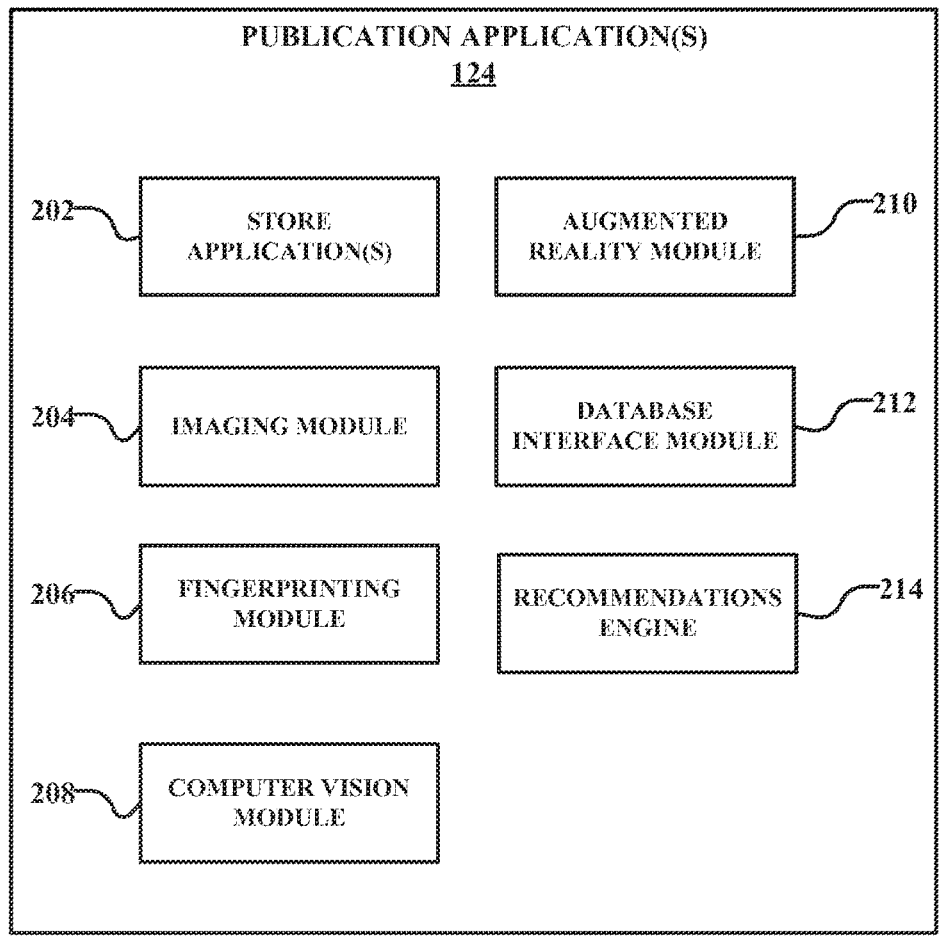
FIG. 2 is a block diagram illustrating multiple publication applications, which may be provided as part of a network-based publication system, according to some example embodiments.

FIG. 2 is a block diagram illustrating an example embodiment of multiple publication application(s) 124, which are provided as part of the network-based publisher 102. The applications 124 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access application servers 122 and one or more databases 128 via database servers 126.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the publication applications 124 are shown to include store application(s) 202 that permit sellers to list individual goods and/or services (hereinafter generically referred to as "items") for sale via the network-based publisher or group their listings within a "virtual" store, which may be branded and otherwise personalized by and for the sellers. Individual and grouped listings may include details such as a title of an item offered for sale, a description of the item, a price of the item, one or more pictures of the item, a geographic location of the seller or the item, payment and shipping options, and a return policy. The virtual store also may offer promotions, incentives and features that are specific and personalized to a relevant seller. In one embodiment, a seller using a virtual store to sell their goods and services may result in the network-based publisher 102 determining a higher reputation value because of an inherent trustworthiness (e.g., higher reputation value) of a "business" over an individual seller.

Within the store application(s) 202 may be included one or more auction applications (not shown) which support auction-format listing and price setting mechanisms (e.g., English, Dutch, Vickrey, Chinese, Double, Reverse auctions etc.). The various auction applications may also provide a number of features in support of such auction-format listings, such as a reserve price feature whereby a seller may specify a reserve price in connection with a listing and a proxy-bidding feature whereby a bidder may invoke automated proxy bidding.

The store application(s) 202 may further include a number of fixed-price applications (not shown) support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Although the auction and fixed-priced applications have been described as being part of the store application(s) 202 herein, it is contemplated that the auction and fixed-priced applications may be standalone applications.

An imaging module 204 receives an image transmitted from a client device (e.g., client device 106). In some embodiments, the imaging module 204 performs image recognition techniques (e.g., edge detection, foreground segmentation, pattern matching) on the image to identify an object or aspects of the object contained within the image. To the extent necessary, the imaging module 204 may enhance the attributes of the image to aid in the processing of the image.

A fingerprinting module 206 may receive the processed image from the imaging module 204 and may generate one or more fingerprints of the image. In some embodiments, the fingerprints may refer to the object(s) contained within the image rather than the entire image itself. The fingerprints may be identifiers that identify the object contained in the image. In some embodiments, the identifier may be a number. In some embodiments, the identifier may be a unique identifier that identifies the object, while in other embodiments, the identifier may be a shared identifier that, for example, identifies a particular attribute or category of the object. In some embodiments, the fingerprints are markers in the image that aid the processing of the image. A fingerprint may be calculated using information within the image. For example, a luminosity histogram may be used as a fingerprint.

The fingerprinting module 206 may generate a database of fingerprints corresponding to one or more items. In the event the fingerprinting module 206 identifies an unknown fingerprint, the fingerprinting module 206 may perform procedures to identify and store the fingerprint in the database. Such procedures may include prompting a user to provide additional information about the unknown object in the image, extracting object attributes from the image containing the unknown object, accessing one or more external systems to look up and retrieve additional information related to the object, and so forth. For example, the user may be prompted to identify the object by speaking about the object. The fingerprinting module 206 may perform voice recognition to convert the audio information into one or more object attributes.

A computer vision module 208 compares the one or more fingerprints to the database of stored fingerprints. Using the results of the comparison, the computer vision module 208 may process the image to identify any objects contained in the image.

An augmented reality module 210 generates an augmented reality view to overlay the image received from the client device. In some embodiments, the augmented reality view is positioned over the image using the identified fingerprints. The augmented reality view may be interactive, and one or more different augmented reality views may be generated depending on interactions with the augmented reality view by the user. For example, a first augmented reality view may identify the object or aspects of the object contained in the image. In response to user input, in some embodiments, a second augmented reality view corresponding to instructions or tutorials relating to the object may be presented. In some embodiments, a third augmented reality view may identify one or more products offered for sale. The products may be the object itself or items related to the object. In some embodiments, the augmented reality view may be a video that is overlaid on the object.

A database interface module 212 accesses one or more databases and retrieves data for inclusion in the augmented reality views. The data may correspond to instructions or tutorials for products, listings of products or related products offered for sale, directions to one or more sellers offering the products or related products for sale, and so forth. In some embodiments, the databases may include databases both internal to the network-based publisher 102 and external.

In an embodiment, an augmented reality view may include position data relating where to position the retrieved data in the image or video. The position data may be absolute (e.g., coordinate), relative to an edge of the image (e.g., 10 pixels from the top), or relative to an identified object in the image (e.g., in the 5 pixels left of the object).

A recommendations engine 214 receives information identifying the object(s) contained in the image and generates product recommendations that may be included in the augmented reality view. In an embodiment, the product recommendations are retrieved from a database. The product recommendations included in the augmented reality view may be interactive. For example, upon selection of a product presented in an augmented reality view, the user may be redirected into a purchase flow whereby the user may perform the steps needed to purchase the product. In various embodiments, the steps may include directing the user to an online marketplace. The online marketplace may include a listing of purchase opportunities related to the product recommendation. For example, a product recommendation may be for an audio cable when the object in the image is a stereo. When the audio cable recommendation is presented on the client device and the audio cable is selected, the user may be taken to a listing of audio cables available for purchase. As with the data in the database, position data for the recommendations may be defined for use in the augmented reality view.

Figure 3:
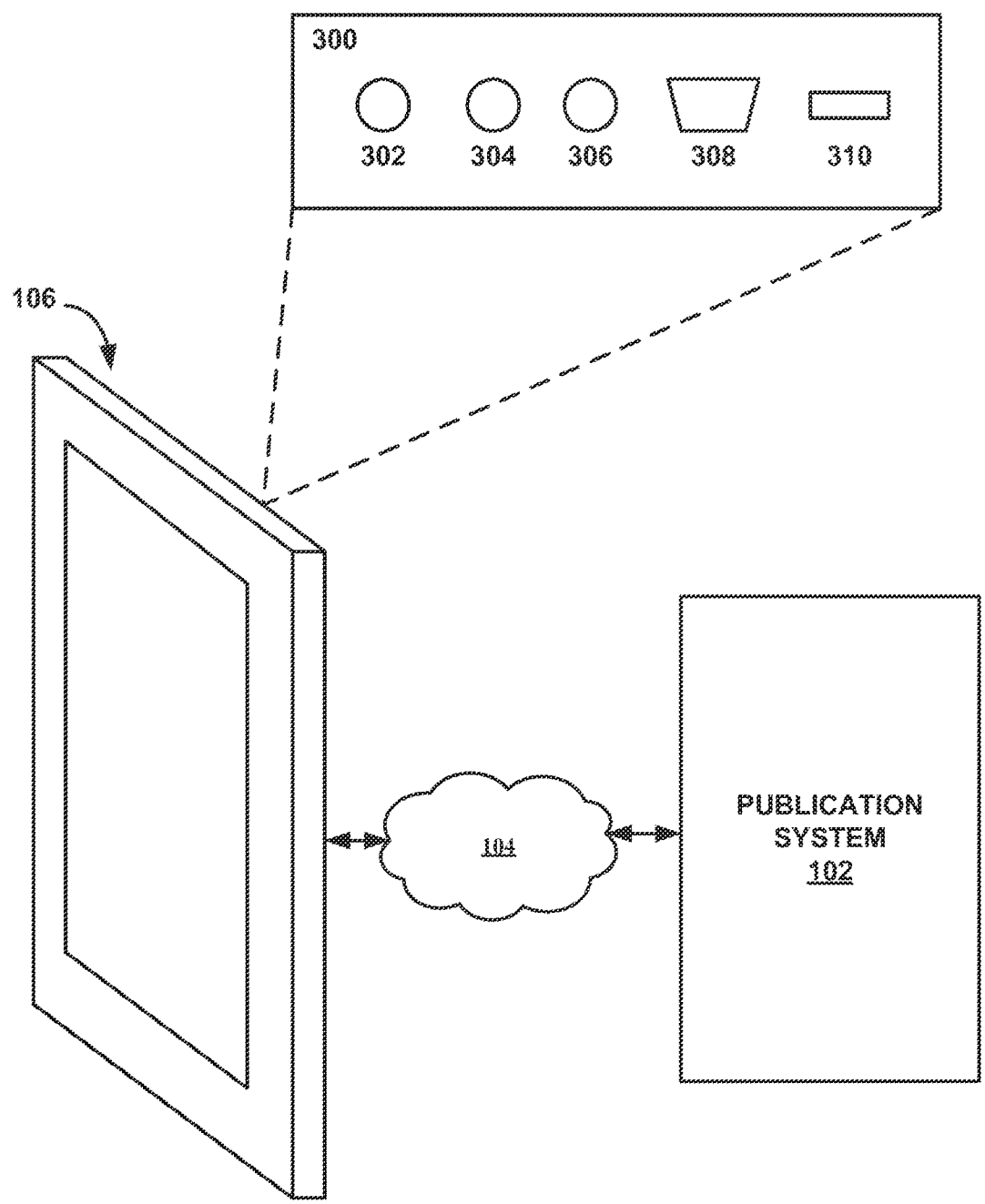
FIG. 3 is a diagram illustrating the generation of an augmented reality view of an item, according to some embodiments.

FIG. 3 illustrates an example client device 106 in the form of a mobile tablet computer. Other client devices may include, but are not limited to, laptop computers and mobile phones (e.g. smart phones). In various embodiments, the client device includes at least one processor, display, image capture device, network interface, and input device. The display may be a touchscreen or non-interactive display. In an embodiment, the image capture device is a camera. The network interface may be configured to transmit and receive on multiple frequencies (e.g., 4G, 3G, 802.11, etc.) over network 104 with publication system 102. The input device may be a keyboard, touchscreen, gesture capture, stylus or a combination thereof. In various embodiments, client device 106 also includes one or more applications that are executed by the at least processor. The executed applications may be configured to perform the functions and methods described herein.

FIG. 3 further illustrates electronics item 300. In an embodiment, electronics item 300 is a video player. The video player may include video RCA output 302, audio RCA outputs 304, 306, VGA output 306, and HDMI output 310. FIG. 3 illustrates client device capturing an image of electronics item 300 using an image capture device.

Figure 4:
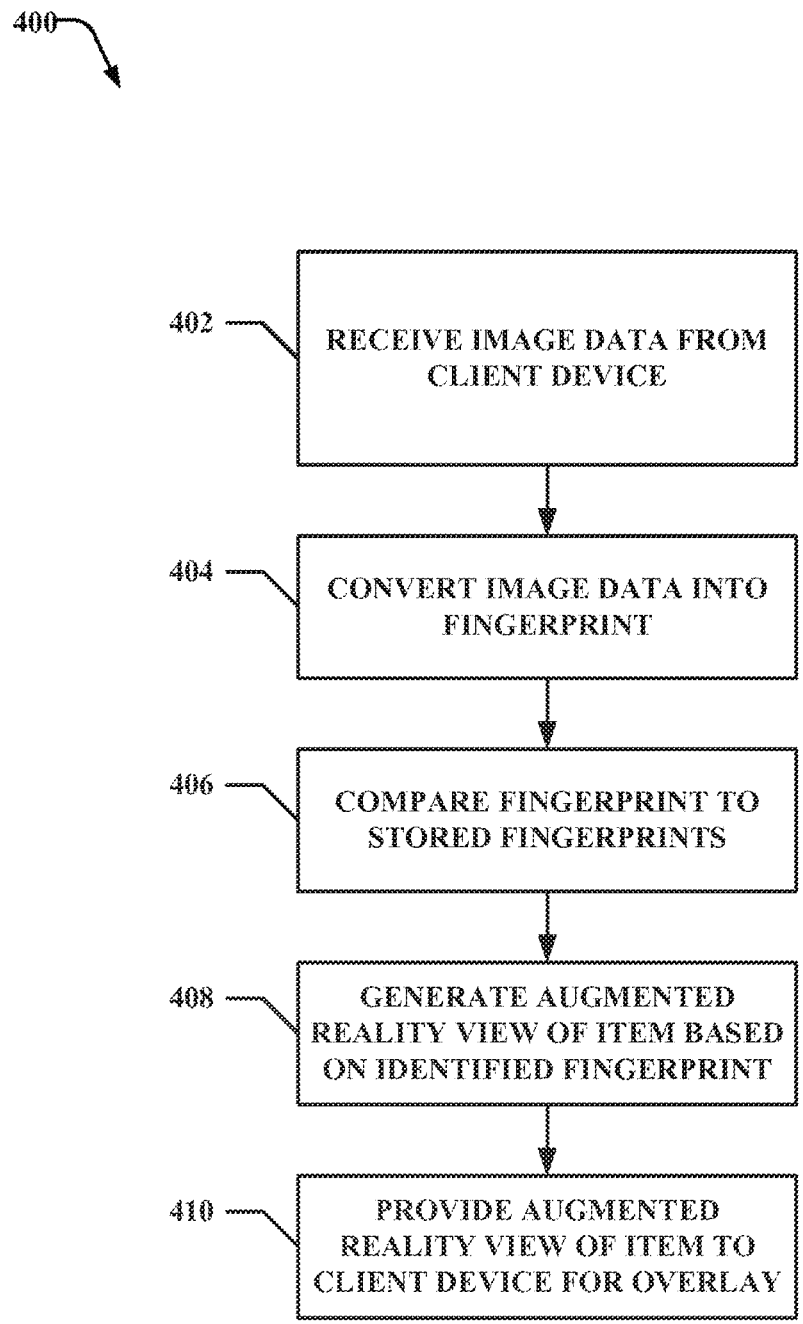
FIG. 4 is a flow chart of an example method for generating an augmented reality of view of an item, according to some embodiments.

FIG. 4 illustrates an example method to provide an augmented reality view of an item on a client device. In this example, the method 400 may include operations such as receiving image data from the client device 402, converting image data into a fingerprint 404, comparing the fingerprint to stored fingerprints 406, generating an augmented reality view of the an item based on the identified fingerprint 408, and providing the augmented reality view of the item to a client device for overlay 410.

At block 402, image data is received from a client device. In an embodiment, the image data is received over network 104 at application server such as application server 122. The image data may be from an image captured using an image capture device of the client device. For example, an application may be run on the client device that prompts the user to take a picture of an object (e.g., an item) the user wishes additional information for. In various embodiments, guidelines are presented on the display of the client device to help frame a picture of the object. After the picture is taken, the resulting image data may be transmitted to the application server. In various embodiments, multiple images are taken and transmitted to the application server.

In an embodiment, at block 404, the image data is converted into a digital fingerprint (e.g., a numerical value or series of values of characteristics of the image). The conversion process may be done using a module such as fingerprinting module 206 as described previously. More than one fingerprint may be generated from the image data.

In an embodiment, at block 406, the digital fingerprint(s) from block 404 is compared against a database of stored digital fingerprints. For example the digital fingerprint from image data may be a number that was generated using fingerprint module 206. A database of stored digital fingerprints may be queried using the generated number for possible matches.

In an embodiment, at block 408, an augmented reality view of the item based on the identified fingerprints is generated and, at block 410, the augmented reality view of the item may be transmitted back to the client device for overlay. For example, a module such as augmented reality module 210, may be used to retrieve information associated with the electronics item. This processes is explored in further detail in FIG. 5. The gathered information may be transmitted as alphanumeric data, video data, or image data, to the client device as an augmented reality view. For example, the alphanumerical data may include text identifying components 302-310. This text, or other data, may then be overlaid on a picture of electronics item 300 within the display of client device 106.

In various embodiments, the application server determines the locations (e.g., position) of where to overlay the gathered information in the augmented reality view. In an embodiment, the information itself and placement information may be considered a generated augmented reality view. In various other embodiments, the data is overlaid in a video of electronics item 300. The video may be a "live" view of the electronics item as a user is pointing the image capture device at the item.

Figure 5:
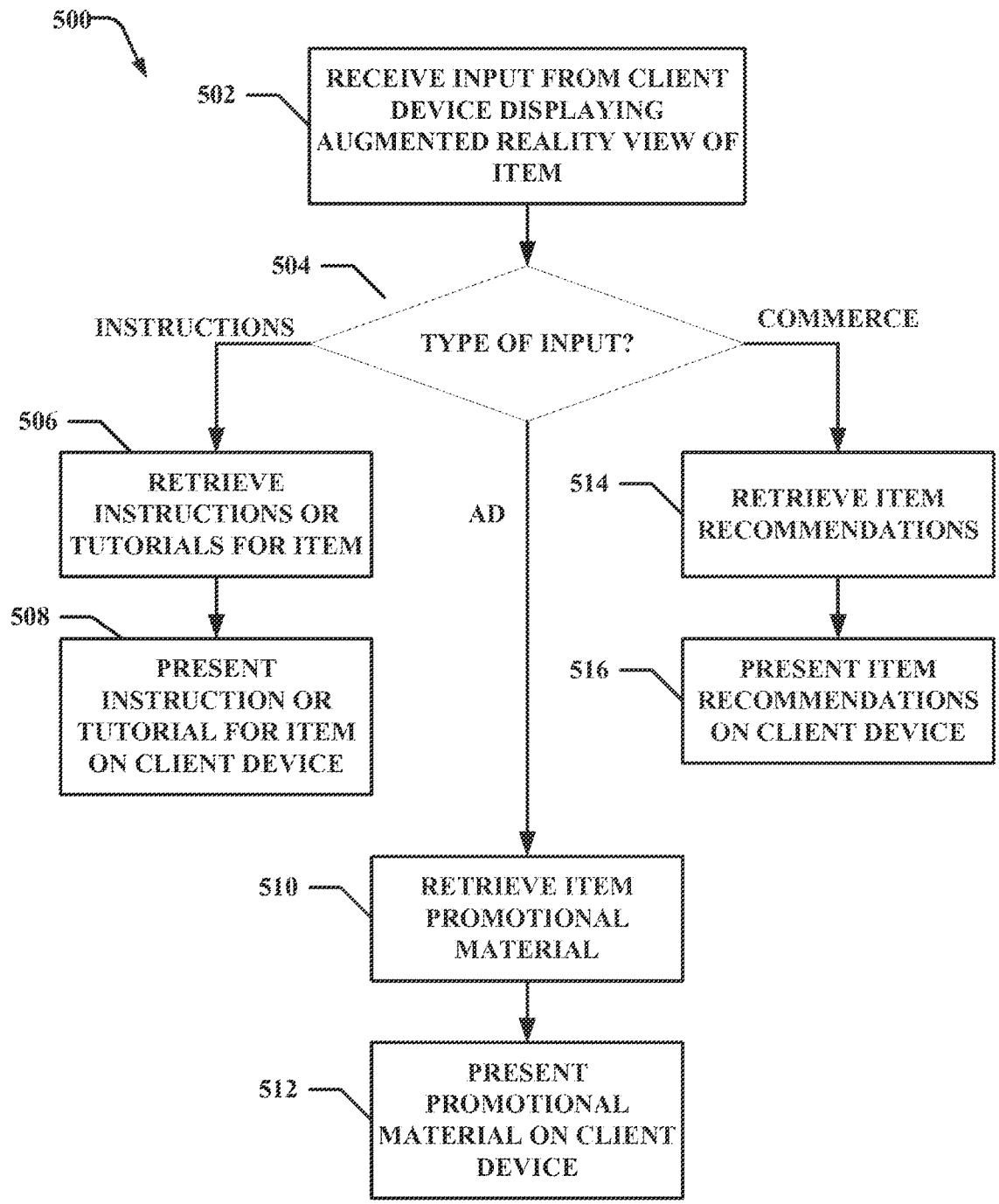
FIG. 5 is a flow chart of an example method for processing inputs received from an augmented reality-enhanced display of an item, according to some embodiments.

FIG. 5 is a flow chart 500 of an example method for processing inputs received from an augmented reality-enhanced display of an item at an application server, according to some embodiments. The method be started after transmitting an augmented reality view as discussed in flow chart 400. In this example, the method 500 may include operations such receiving input from a client device displaying the augmented reality view of an item 502 and determining the type of input 504 then, if the type is instructions, retrieving instructions of tutorials for the item 506, and presenting the instructions of tutorial for the item on a client device 508, if the type is an ad, retrieving promotional items for the item 510, and presenting the promotional items for the item on a client device 512, and if the type is commerce, retrieving item recommendations for the item 514, and presenting the item recommendations for the item on a client device 516.

In an embodiment, at block 502, input is received from a client device displaying an augmented reality view of an item. In other embodiments, the input may be received with the image data. The input may represent a request type for additional information concerning the item. For example, the input may be for instructional information, promotional information, or commerce information. Additional input types may also be used without departing from the scope of this disclosure. In various embodiments, an application running on the client device prompts a user for the request type.

In an embodiment, at decision block 504, it is determined what type of input has been requested from the user based on the received information. As depicted, one of three types of input may be processed with method 500.

In an embodiment, at block 506, it is determined that the request type is for instructions related to the item displayed on the client device instructions or tutorials are retrieved for the item. For example, the identification of the object (e.g., as determined from the fingerprint) may be used as an input to a query of an internal database containing instructions and tutorials for a plurality of items. In various embodiments, externals sources are searched for instructions and tutorials related to the item. The retrieved instructions or tutorials are then transmitted back to the client device. In an embodiment, at block 508, the client device displays the instructions or tutorials.

In an embodiment, at block 510, it is determined that the request type is for advertisements related to the item displayed on the client device and promotional materials are retrieved for the item. For example, the identification of the object (e.g., as determined from the fingerprint) may be used as an input to a query of an internal database containing promotional materials for a plurality of items. In various embodiments, externals sources are searched for promotional materials related to the item. The retrieved promotional materials are then transmitted back to the client device. In an embodiment, at block 512, the client device displays the promotional materials. In various embodiments, additional information such as where to purchase items included in the promotional materials may be transmitted to the client device.

In an embodiment, at block 514, it is determined that the request type is for commerce materials related to the item displayed on the client device and item recommendation are retrieved for the item. For example, the identification of the object (e.g., as determined from the fingerprint) may be used as an input to a query of an internal database containing item recommendations for a plurality of items (e.g., using recommendations engine 214). In various embodiments, externals sources are searched for item recommendations related to the item. The retrieved recommendations are then transmitted back to the client device. In an embodiment, at block 512, the client device displays the item recommendations. In an embodiment, a location (e.g., website, physical address, e-commerce listing) to purchase the item is also transmitted to the client device.

Figure 6:
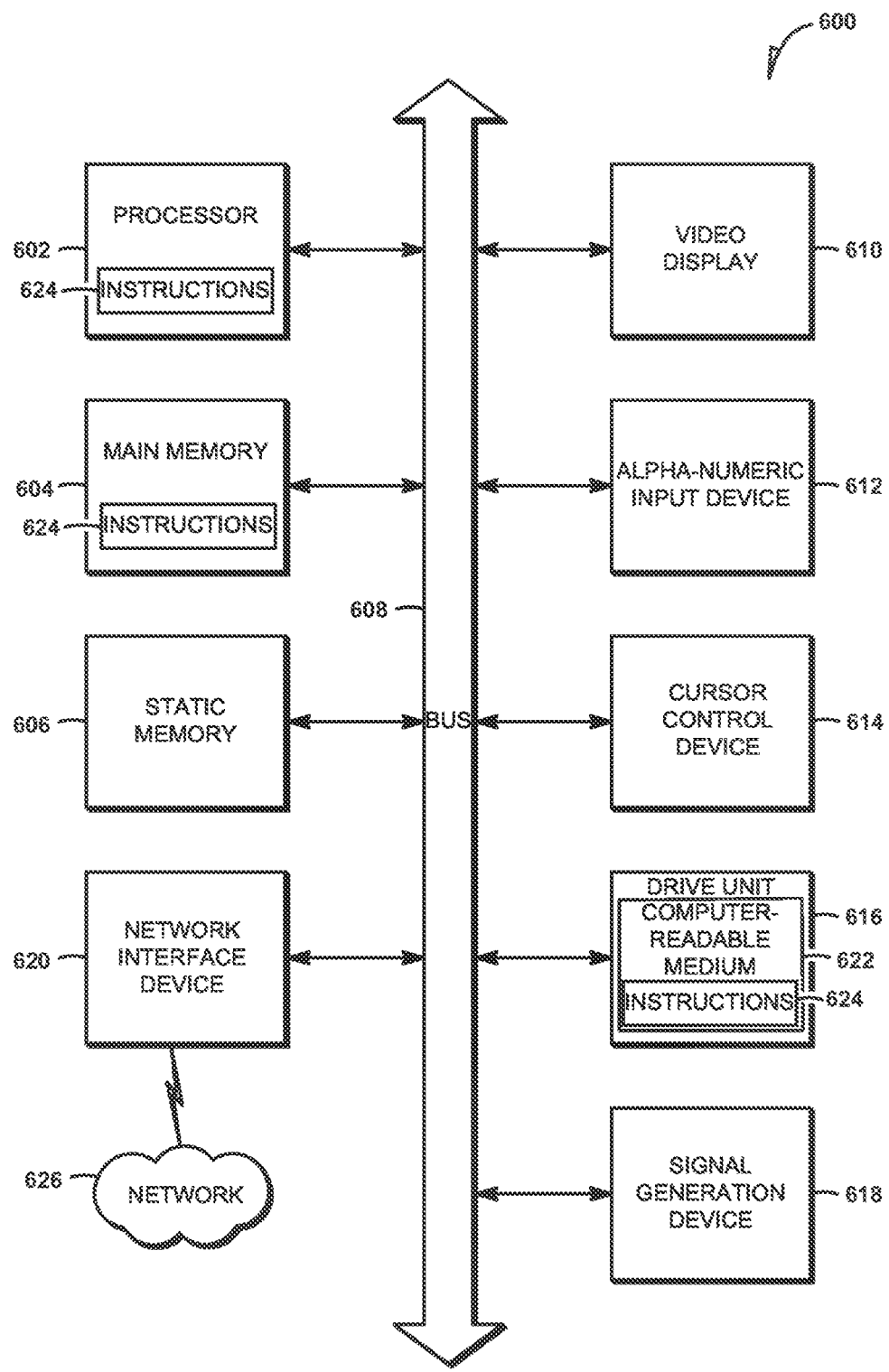
FIG. 6 shows a diagrammatic representation of machine in the example form of a computer system within which a set of instructions may be executed to cause the machine to perform any one or more of the methodologies discussed herein.

FIG. 6 shows a diagrammatic representation of machine in the example form of a computer system 600 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620 utilizing any one of a number of well-known transfer protocols (e.g., HTTP).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical media, and magnetic media.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
receiving, from an image capturing device of a client device, image data captured by the image capturing device;
identifying, from the received image data, one or more objects by generating a fingerprint from the received image data, the fingerprint including a numerical identifier that corresponds to at least one of the one or more objects;
generating an augmented reality view of the at least one of the one or more identified objects using position data and the fingerprint, the augmented reality view including the received image data and information correlated with the identified object overlaid on the received image data based on the position data, the position data indicative of where the information is to be overlaid on the received image; and
transmitting the augmented reality view for display on the client device in real time.

2. The method of claim 1, wherein the generated augmented reality view is a live view of the one or more objects captured in the image data by the image capturing device.

3. The method of claim 1, wherein the generated augmented reality view provides for user interactivity on a display device on the client device.

4. The method of claim 3, wherein the generated augmented reality view is a first augmented reality view, the method further comprising:
receiving an interactive user input from the display device of the client device;
generating, in response to receiving the interactive user input, a second augmented reality view, the second augmented reality view including the received image data and information corresponding to the interactive user input overlaid on the received image data; and
transmitting the second augmented reality view for display on the client device in real time.

5. The method of claim 4, wherein the information corresponding to the interactive user input in the second augmented reality view includes a tutorial related to the at least one of the one or more identified objects.

6. The method of claim 4, wherein the information corresponding to the interactive user input in the second augmented reality view includes a listing of the at least one of the one or more identified objects for sale on a merchant website.

7. The method of claim 1, wherein the information correlated with the identified object that is overlaid on the received image data in the augmented reality view is a video.

8. A computer-readable storage device including instructions stored thereon, which when executed by at least one processor, cause the processor to perform operations comprising:
receiving, from an image capturing device of a client device, image data captured by the image capturing device;
identifying, from the received image data, one or more objects by generating a fingerprint from the received image data, the fingerprint including a numerical identifier that corresponds to at least one of the one or more objects;
generating an augmented reality view of the at least one of the one or more identified objects using position data and the fingerprint, the augmented reality view including the received image data and information correlated with the identified object overlaid on the received image data based on the position data, the position data indicative of where the information is to be overlaid on the received image; and
transmitting the augmented reality view for display on the client device in real time.

9. The storage device of claim 8, wherein the generated augmented reality view is a live view of the one or more objects captured in the image data by the image capturing device.

10. The storage device of claim 8, wherein the generated augmented reality view provides for user interactivity on a display device on the client device.

11. The storage device of claim 10, wherein the generated augmented reality view is a first augmented reality view, and wherein the operations further comprise:
receiving an interactive user input from the display device of the client device;
generating, in response to receiving the interactive user input, a second augmented reality view, the second augmented reality view including the received image data and information corresponding to the interactive user input overlaid on the received image data; and
transmitting the second augmented reality view for display on the client device in real time.

12. The storage device of claim 11, wherein the information corresponding to the interactive user input in the second augmented reality view includes a tutorial related to the at least one of the one or more identified objects.

13. The storage device of claim 11, wherein the information corresponding to the interactive user input in the second augmented reality view includes a listing of the at least one of the one or more identified objects for sale on a merchant website.

14. The storage device of claim 8, wherein the information correlated with the identified object that is overlaid on the received image data in the augmented reality view is a video.

15. A system comprising:
a server comprising:
- a communication device configured to receive, from an image capturing device of a client device, image data captured by the image capturing device;
- one or more processors in communication with the communication device; and
- one or more non-transitory computer-readable media storing instructions thereon that, when executed by the one or more processors, cause the server to perform operations, the operations including:
  - identifying, from the received image data, one or more objects by generating a fingerprint from the received image data, the fingerprint including a numerical identifier that corresponds to at least one of the one or more objects;
  - generating an augmented reality view of the at least one of the one or more identified objects using position data and the fingerprint, the augmented reality view including the received image data and information correlated with the identified object overlaid on the received image data based on the position data, the position data indicative of where the information is to be overlaid on the received image; and
  - instructing the communication device to transmit the augmented reality view to the client device for display on the client device in real time.

16. The system of claim 15, wherein the generated augmented reality view is a live view of the one or more objects captured in the image data by the image capturing device.

17. The system of claim 15, wherein the generated augmented reality view provides for user interactivity on a display device on the client device.

18. The system of claim 17, wherein the generated augmented reality view is a first augmented reality view, and wherein the operations further comprise:
- receiving an interactive user input from the display device of the client device;
- generating, in response to receiving the interactive user input, a second augmented reality view, the second augmented reality view including the received image data and information corresponding to the interactive user input overlaid on the received image data; and
- transmitting the second augmented reality view for display on the client device in real time.

19. The system of claim 18, wherein the information corresponding to the interactive user input in the second augmented reality view includes one of a tutorial related to the at least one of the one or more identified objects or a listing of the at least one of the one or more identified objects for sale on a merchant website.

20. The system of claim 15, wherein the information correlated with the identified object that is overlaid on the received image data in the augmented reality view is a video.

* * * * *